United States Patent [19]
Sallen et al.

[11] Patent Number: 5,589,821
[45] Date of Patent: Dec. 31, 1996

[54] DISTANCE DETERMINATION AND ALARM SYSTEM

[75] Inventors: Roy Sallen, Wayland; W. James Budzyna, Whitinsville; Charles E. Sawabini, Carlisle, all of Mass.

[73] Assignee: Secure Technologies, Inc., Boston, Mass.

[21] Appl. No.: 355,041

[22] Filed: Dec. 13, 1994

[51] Int. Cl.$^6$ .................................................. G08B 21/00
[52] U.S. Cl. .......................... 340/573; 340/539; 342/127
[58] Field of Search .................................... 340/539, 573; 342/127

[56] References Cited

U.S. PATENT DOCUMENTS

| | | | |
|---|---|---|---|
| 3,144,645 | 8/1964 | McIver et al. | 342/127 |
| 4,136,338 | 1/1979 | Antenore | 340/551 |
| 4,260,982 | 4/1981 | DeBenedictis et al. | 340/539 |
| 4,675,656 | 6/1987 | Narcisse | 340/539 |
| 4,757,315 | 7/1988 | Lichtenberg et al. | 342/127 |
| 4,785,291 | 11/1988 | Hawthorne | 340/573 |
| 4,792,796 | 12/1988 | Bradshaw et al. | 340/539 |
| 4,814,751 | 3/1989 | Hawkins et al. | 340/573 |
| 5,021,794 | 6/1991 | Lawrence | 342/457 |
| 5,115,223 | 5/1992 | Moody | 340/573 |
| 5,119,072 | 6/1992 | Hemingway | 340/573 |
| 5,170,172 | 12/1992 | Weinstein | 342/458 |

*Primary Examiner*—Glen Swann
*Attorney, Agent, or Firm*—Bromberg & Sunstein

[57] ABSTRACT

A system generates an alarm at one unit of the system when a second unit of the system is more than a predetermined distance from the first unit. The system has a first transceiver unit with a first transmitter for transmitting a first reference signal having a phase with respect to a reference source, and a first receiver for detecting a second reference signal having a phase which bears a relationship to that of the first reference signal. There is a second, portable, transceiver unit with a second transmitter for transmitting the second reference signal after receipt of the first reference signal. The first transceiver unit includes a distance resolver for determining the distance between the two transceiver units from the phases of the first and second reference signals, and an alarm, responsive to the distance resolver, for generating an alarm signal if the distance between the two transceiver units is more than a predetermined amount.

4 Claims, 23 Drawing Sheets

COMPARATOR

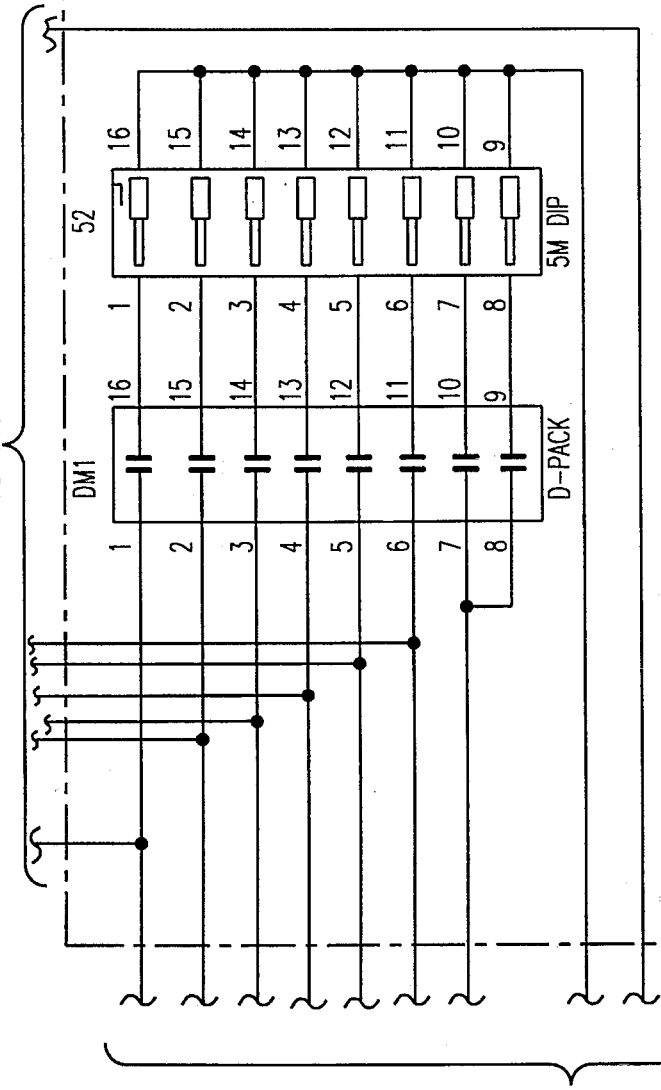

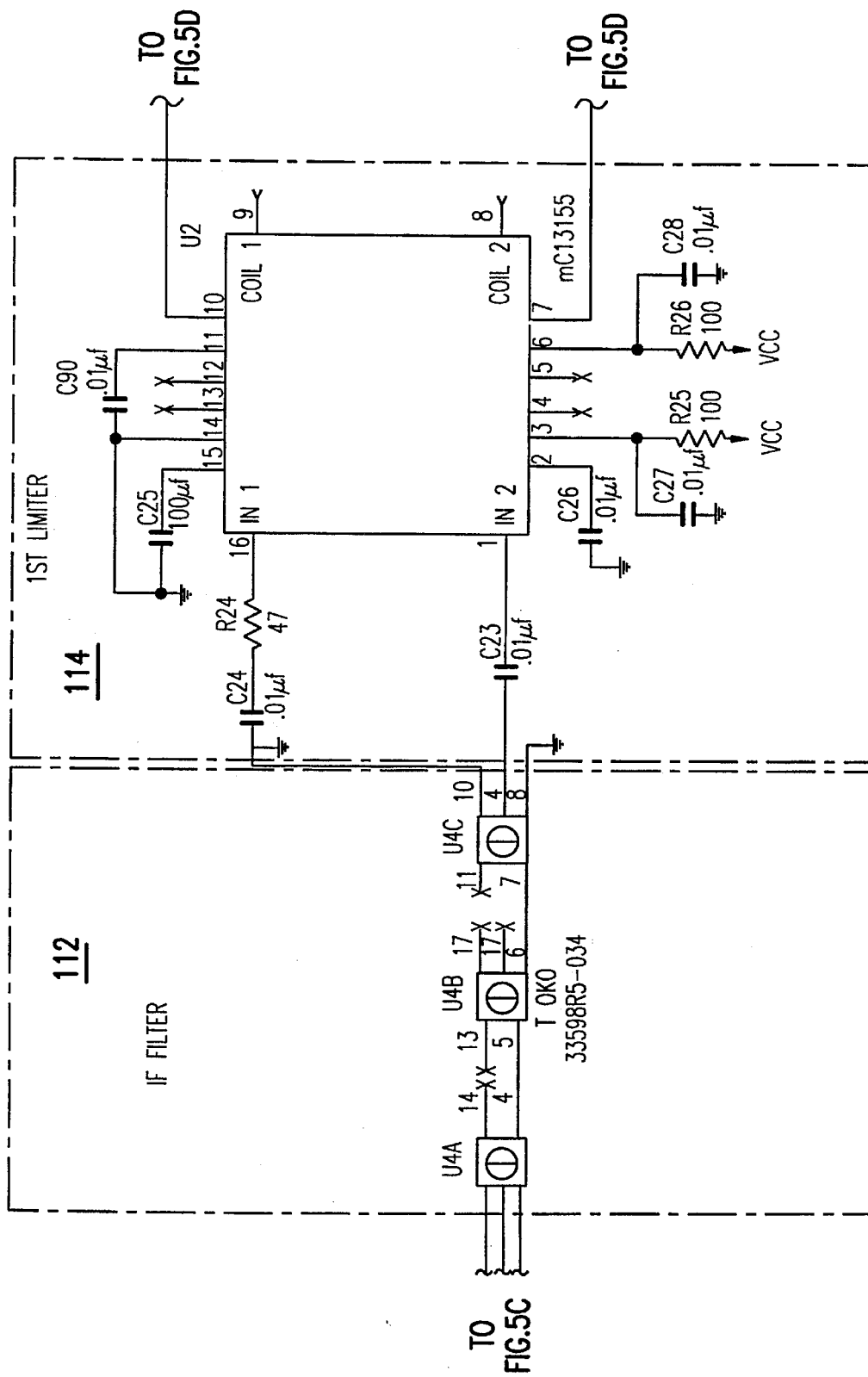

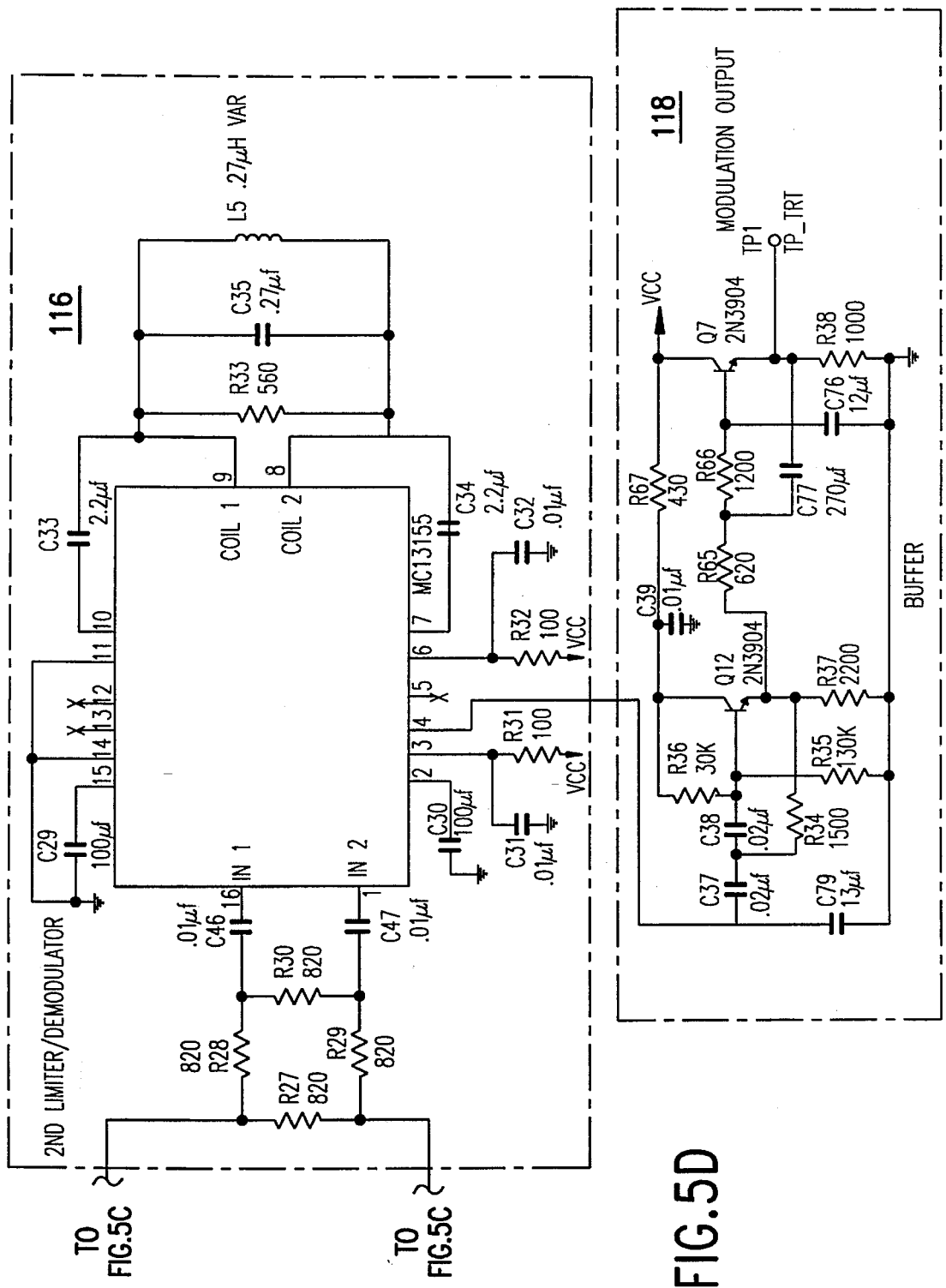

DISTANCE DETERMINATION AND ALARM SYSTEM

FIELD OF INVENTION

This invention relates to a distance determination and alarm system which uses the phase lag of an electromagnetic reference signal transmitted from one unit to a second unit, and back to the first unit, caused by the distance between the units, to determine the distance between the units, and set off an alarm when the distance exceeds a predetermined amount.

BACKGROUND OF INVENTION

There are numerous examples of out-of-range alarm systems. Such systems typically include a base unit and one or more, portable, secondary units adapted to be worn by a person. The secondary units typically transmit an RF signal which is received by the base unit. The distance between the units is determined based on the strength of the signal received from a secondary unit. These systems often include some means of generating an alarm when the distance between the units exceeds a predetermined amount, as a means of notifying the monitoring personnel at the base unit when the animal or person, or persons, wearing the secondary units, are out of range.

These systems have proved unreliable because they rely on received signal strength as a means of determining distance. This calculation presumes that the signal will always emanate at the same strength, and that it will be attenuated as a function of distance in the same manner, regardless of the strength of the batteries used to power the secondary units, the physical surroundings of the area in which the system is used, the positions of the transmit and receive antennas, and weather conditions and other factors which cause differences in signal attenuation. Because there are always unknown factors which will, almost certainly, cause RF signals to attenuate differently, such systems are inherently unreliable.

SUMMARY OF INVENTION

It is therefore an object of this invention to provide an out of range alarm system which is more reliable than other systems.

It is a further object of this invention to provide such a system which does not use signal strength as a means of determining distance between units.

It is a further object of this invention to provide such a system which uses phase lag, caused by the time it takes the signal to traverse the distance between the units, as a distance determinator.

This invention results from the realization that a reliable means of determining distance between two units may be accomplished by transmitting a sinusoidal signal from the base unit to the secondary unit, and back from the secondary unit to the base unit, and comparing the phase of the original signal to that of the signal received back from the secondary unit, to determine the distance between the units based on the phase lag caused by the signal propagation time.

This invention features a system for generating an alarm at one unit when a secondary unit is more than a predetermined distance from the first unit, comprising a first transceiver unit (sometimes called below and in the drawings and claims the "parent unit" or the "base unit") with a first transmitter for transmitting a first reference signal, having a phase with respect to a reference source, and a first receiver for detecting a second reference signal having a phase which bears a relationship to that of the first reference signal. Also included is a second, portable, transceiver unit (sometimes called below and in the drawings and claims the "child unit") with a second transmitter for transmitting the second reference signal, after receipt of the first reference signal. The first transceiver unit further includes a phase difference detector for determining the distance between the two transceiver units from the phases of the first and second reference signals; and an alarm, responsive to the phase difference detector, for generating an alarm signal if the distance between the two transceiver units is more than a predetermined amount. If the system is used as a distance determinator system, the alarm may be omitted.

The second transmitter may include means for matching the phase of the second reference signal to the phase of the first reference signal received by the second transceiver unit. The first transmitter may include first modulator means for modulating a first carrier signal with the first reference signal, and the second transceiver unit may include a second receiver for receiving the modulated signal, and resolving from the modulated signal the first reference signal.

The first transmitter may further include encoder means for enabling the first modulator means to encode the modulated carrier signal with a code for identifying the first transceiver unit. The encoder means may enable the first modulator means to rapidly turn the first reference signal on and off to encode the modulated carrier signal with a code. The second transceiver unit may include decoder means, responsive to the second receiver, for enabling the second transmitter to transmit the second reference signal only after receipt of the first reference signal from the second receiver. The decoder means of the second transceiver unit may be responsive to the code of the modulated carrier signal, and enable the second transmitter to transmit, only after receipt of a code matching a code in the decoder means.

The first transceiver unit may include range selection means for allowing a user to select the predetermined distance, and calibration means for calibrating the system to a known distance between transceiver units. The first and second reference signals preferably have the same frequency, and the second transmitter may include second modulator means for modulating a second carrier signal with the second reference signal, in which case the first and second carrier signals may have different frequencies so that they may be differentiated.

In a more specific embodiment, this invention features a system for generating an alarm at one unit when a secondary unit is more than a predetermined distance from the first unit, comprising: a first, portable, transceiver unit, with a first oscillator means for generating a first reference signal having a phase with respect to a reference source, a first modulator for modulating a first carrier signal with the first reference signal, and a first transmitter for transmitting the modulated first carrier signal. There is a second, portable, transceiver unit, with a first receiver for receiving the modulated first carrier signal, and resolving the first reference signal therefrom, a second modulator for modulating a second carrier signal with the resolved first reference signal, and a second transmitter for transmitting the modulated second carrier signal.

The first transceiver unit in this embodiment includes a second receiver for receiving the modulated second carrier signal, and resolving the first reference signal therefrom. It also includes a phase detector for comparing the phase of the first reference signal generated by the first oscillator to the phase of the first reference signal resolved from the modulated second carrier signal, and providing in response an output signal with a strength related to the phase difference between the two compared signals, a distance resolver means for determining the distance between the two transceiver units from the phase detector output signal, and an alarm responsive to the distance resolver means for generating an alarm signal when the determined distance is more than a predetermined amount.

BRIEF DESCRIPTION OF THE DRAWINGS

Other objects, features and advantages will occur to those skilled in the art from the following description of a preferred embodiment, and the accompanying drawings, in which:

FIGS. 4A through 4M are schematic diagrams of a preferred embodiment of the base unit of FIG. 2.

DESCRIPTION OF THE PREFERRED EMBODIMENT

This invention may be accomplished in a system for generating an alarm at one unit of the system, when a secondary unit of the system is more than a predetermined distance from the first unit. The first transceiver unit includes a transmitter for transmitting a reference signal having a phase with respect to a reference source. The second transceiver unit has a receiver for receiving the reference signal generated by the first transceiver unit, and in response, re-transmitting the received reference signal. The first transceiver unit also includes a receiver for receiving the re-transmitted signal sent by the secondary unit. The distance between the two units is resolved by circuitry which compares the phases of the reference signal as transmitted by the first unit to that of the reference signal received from the secondary unit by the first unit.

The phase lag between these two signals is caused by the time it takes the transmitted signal to travel from the first unit to the secondary unit, and back to the first unit (with additional phase lag from delays caused by the circuitry of each unit). Since the internally-caused phase lag is constant, the phase lag is an accurate means of determining distance. The first transceiver unit resolves the distance, and generates an alarm signal when the resolved distance is greater than a preset distance threshold. The system thus generates an alarm whenever the two units are separated by more than a predetermined distance. Such a system is thus ideally suited for use by parents in keeping track of the location of a child, for example. If the system is to be used as a distance determinator, the alarm may be omitted.

Figure 1:
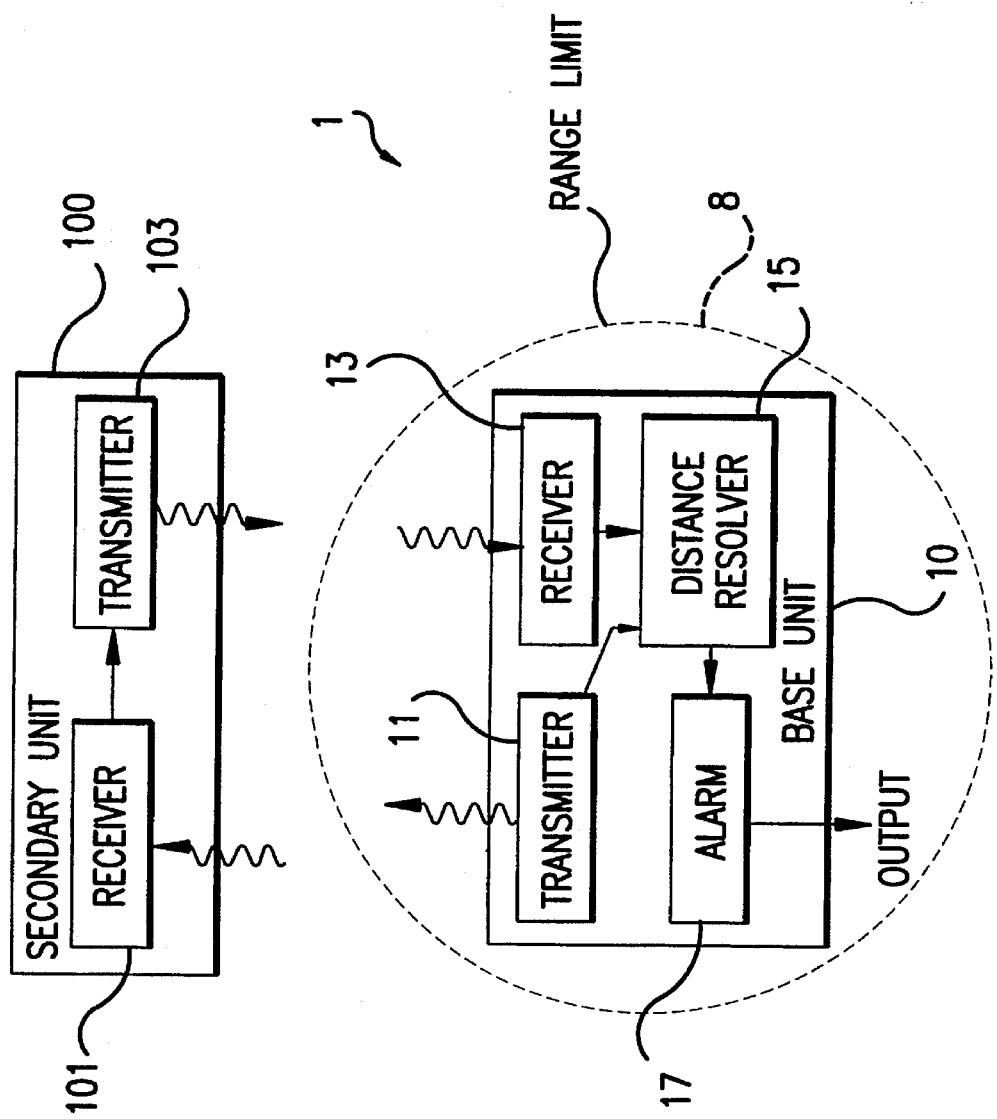
FIG. 1 is a schematic block diagram of an out-of-range alarm system according to this invention.

There is shown in FIG. 1 out-of-range alarm system 1 according to this invention. System 1 includes a first transceiver unit 10, called the "base unit", and a second transceiver unit 100, called the "secondary unit" Base unit 10 includes a first transmitter 11 for transmitting a first electromagnetic reference signal, having a phase with respect to a reference source. Secondary unit 100 includes receiver 101 for receiving the signal transmitted by transmitter 11. Upon receipt of the signal, receiver 101 enables transmitter 103 to transmit a second electromagnetic reference signal, also having a phase bearing a relationship to the phase of the first reference signal. This signal is received by receiver 13 of first unit 10. Distance resolver 15 then compares the phase of the reference signal received by receiver 13 to the phase of the reference signal transmitted by transmitter 11, and determines the distance between unit 10 and unit 100 based on the phase lag between the two signals. Distance resolver 15 then transmits to alarm 17 a signal whose strength is related to that distance. Alarm 17 generates an output alarm signal when the resolved distance is greater than a predetermined amount, so that the person monitoring unit 10 will know when the person wearing unit 100 is more than the predetermined distance from himself or herself. The preset range limit is represented by circle 8, centered on base unit 10.

Figure 2:
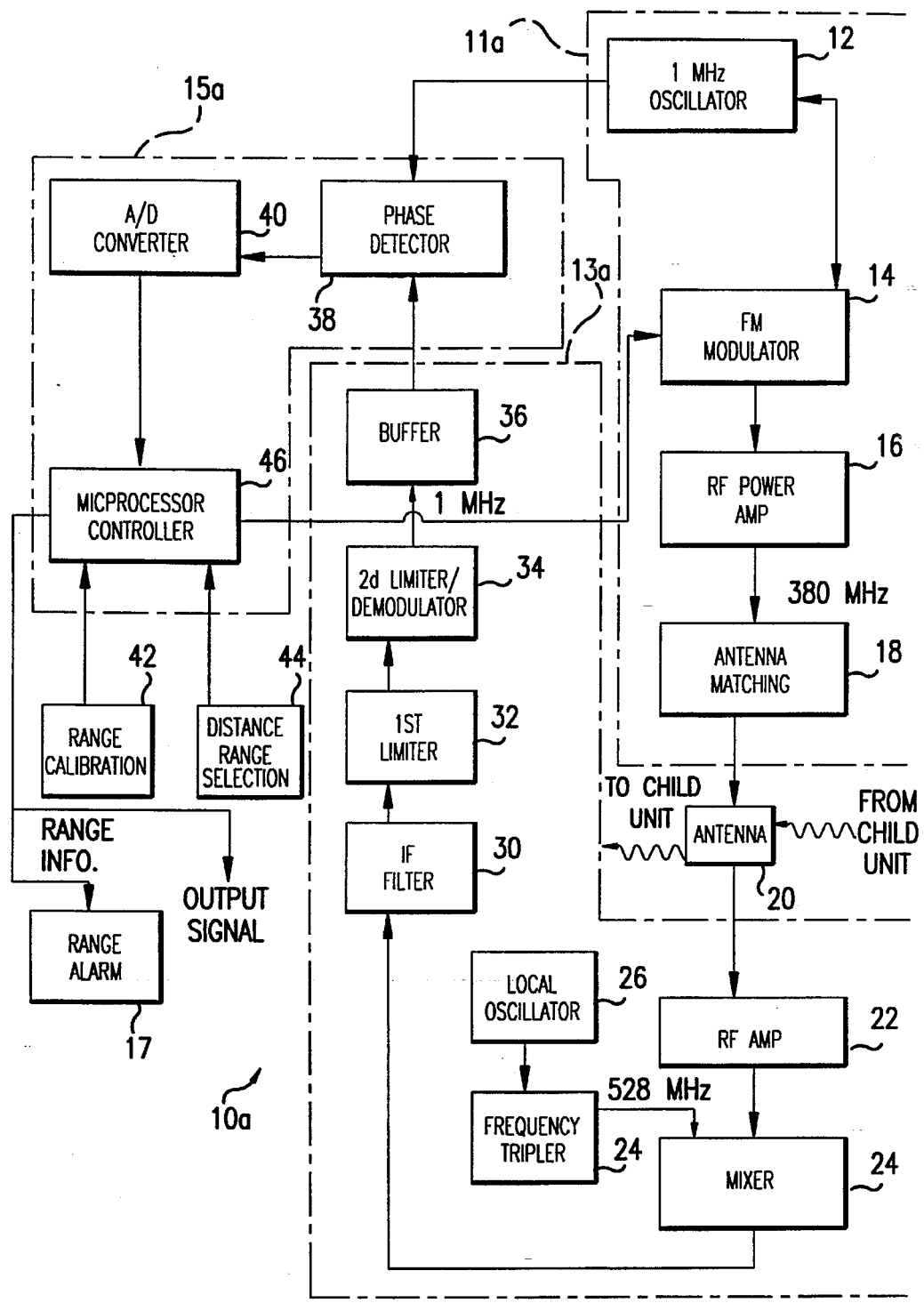
FIG. 2 is a more detailed block diagram of a preferred embodiment of the base unit of FIG. 1.
Figure 3:
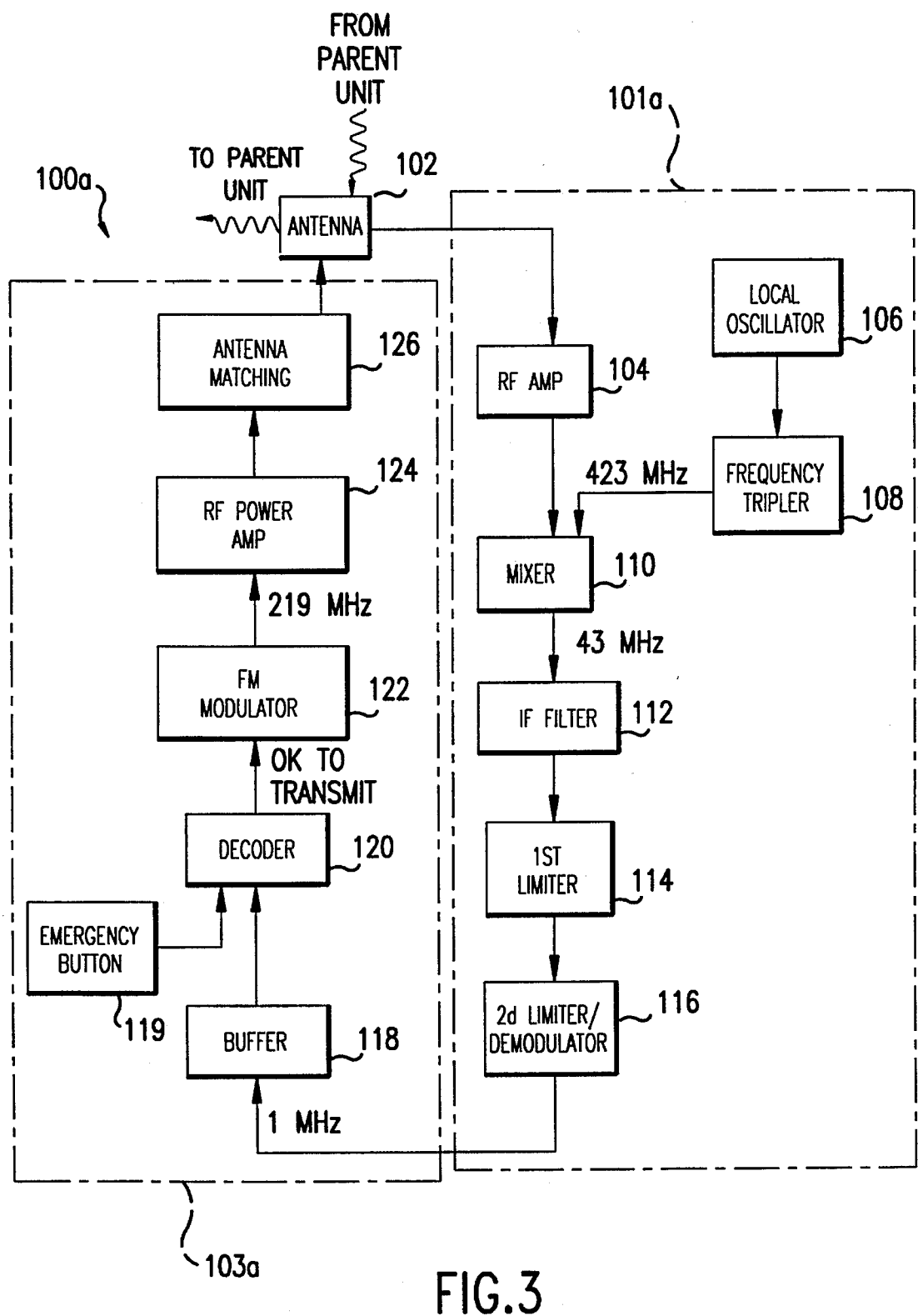
FIG. 3 is a more detailed block diagram of a preferred embodiment of the secondary unit of FIG. 1.
Figure 4A:
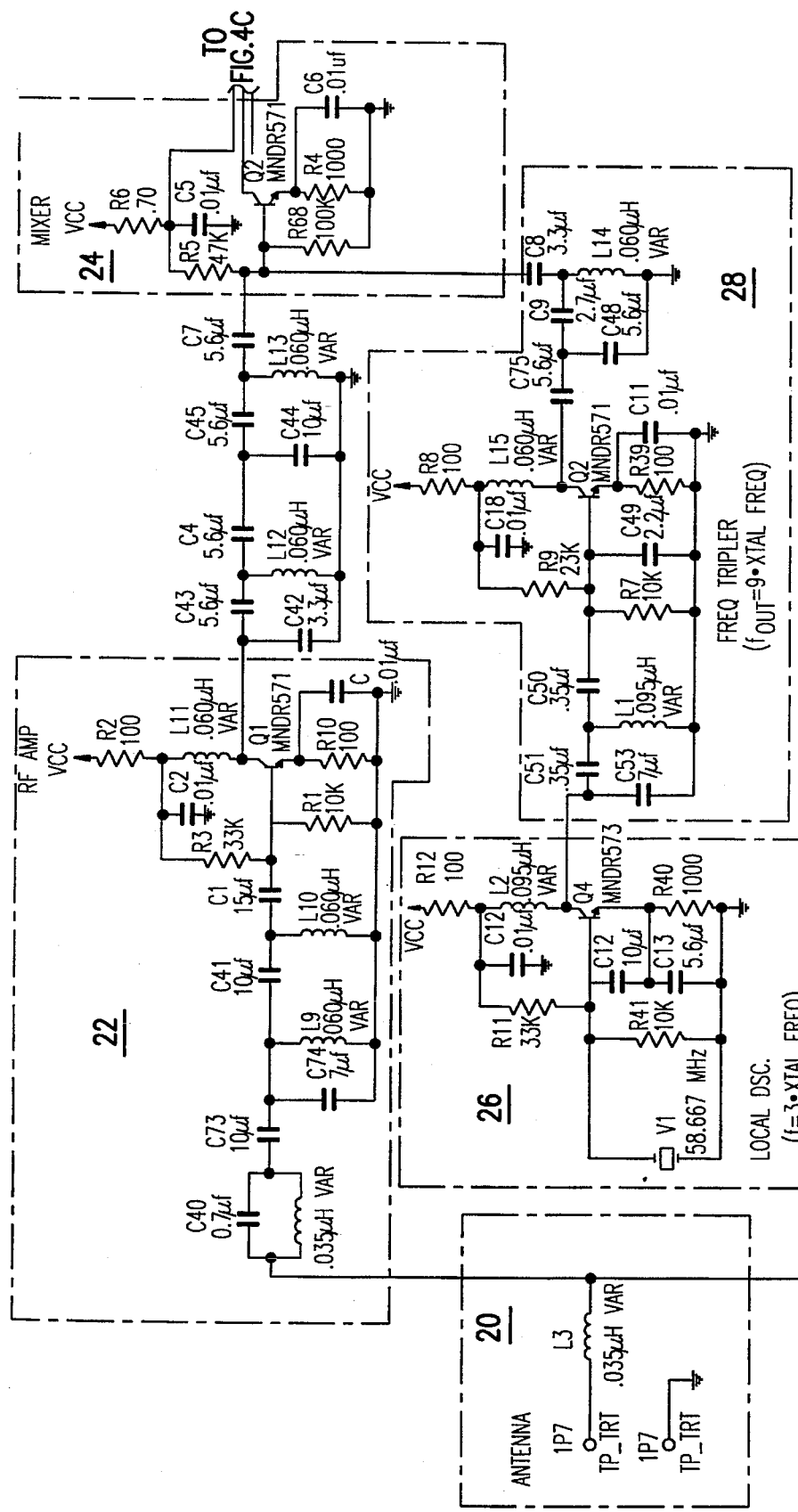
Figure 4B:
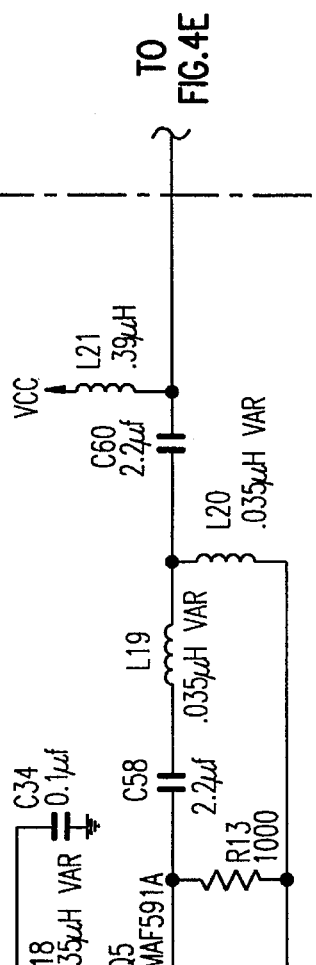
Figure 4B:
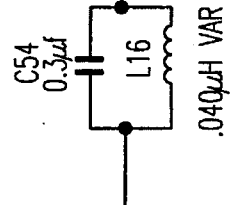
Figure 4B:
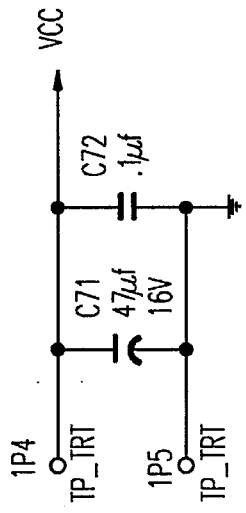
Figure 4C:
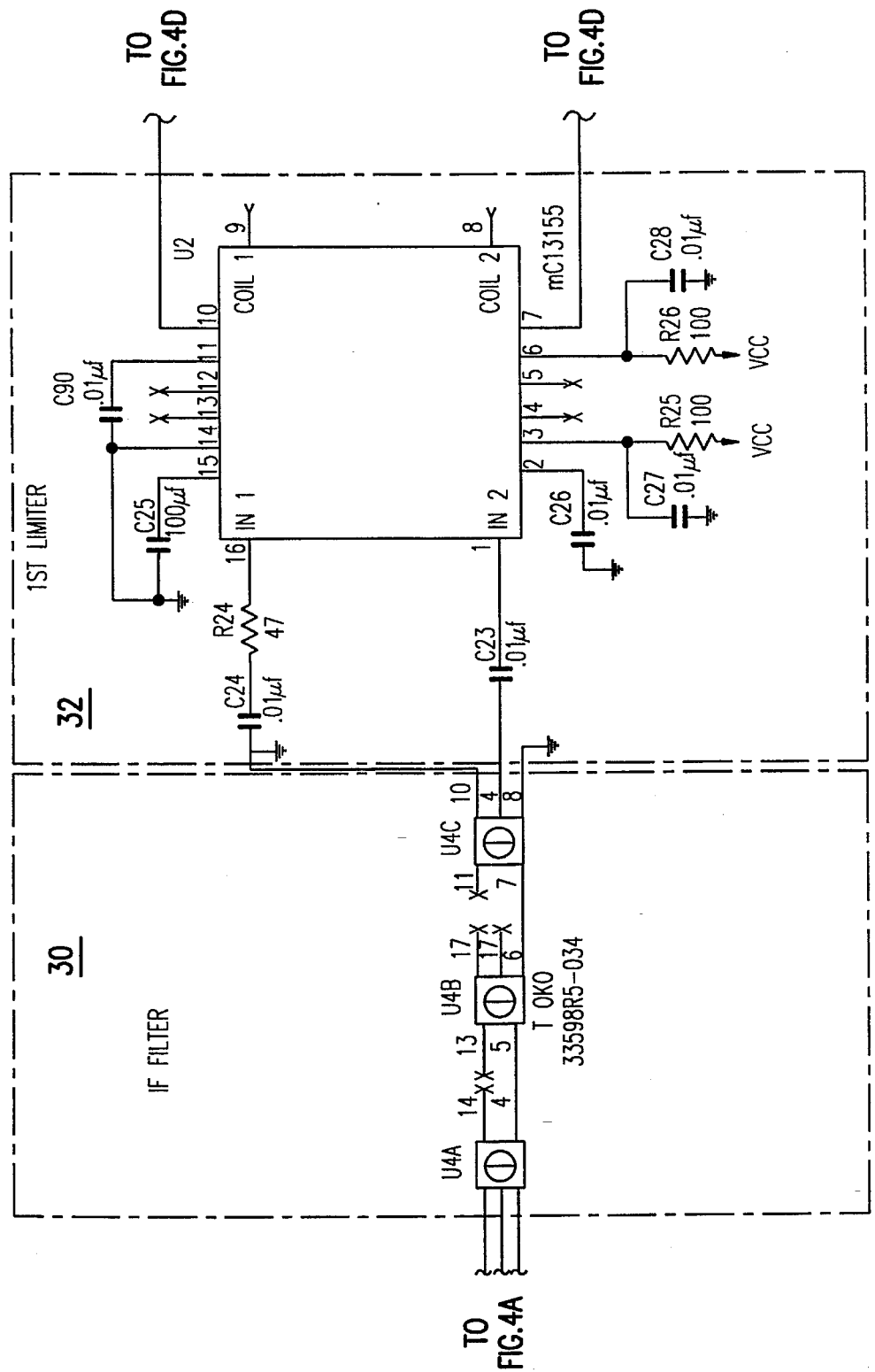
Figure 4D:
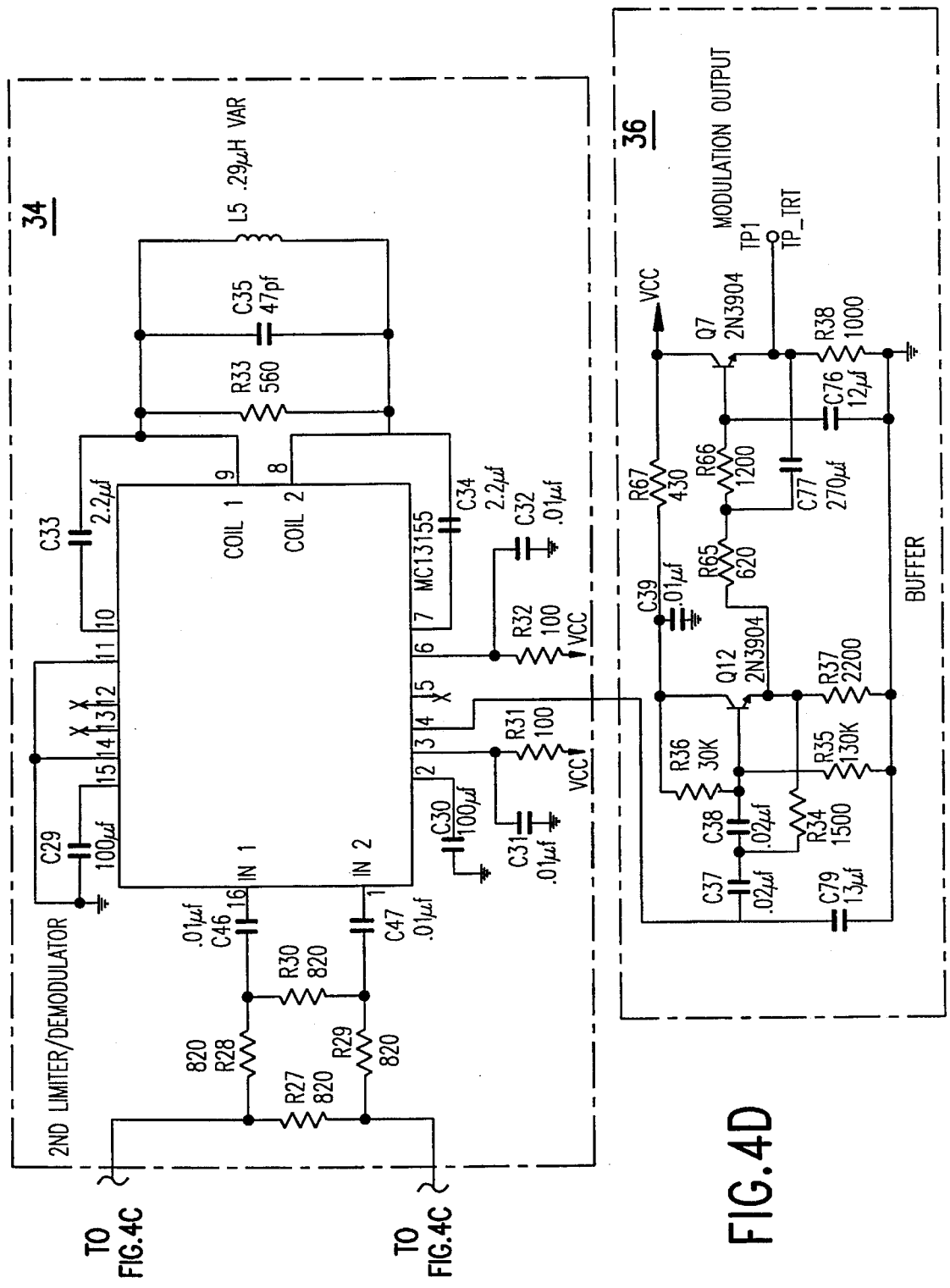
Figure 4E:
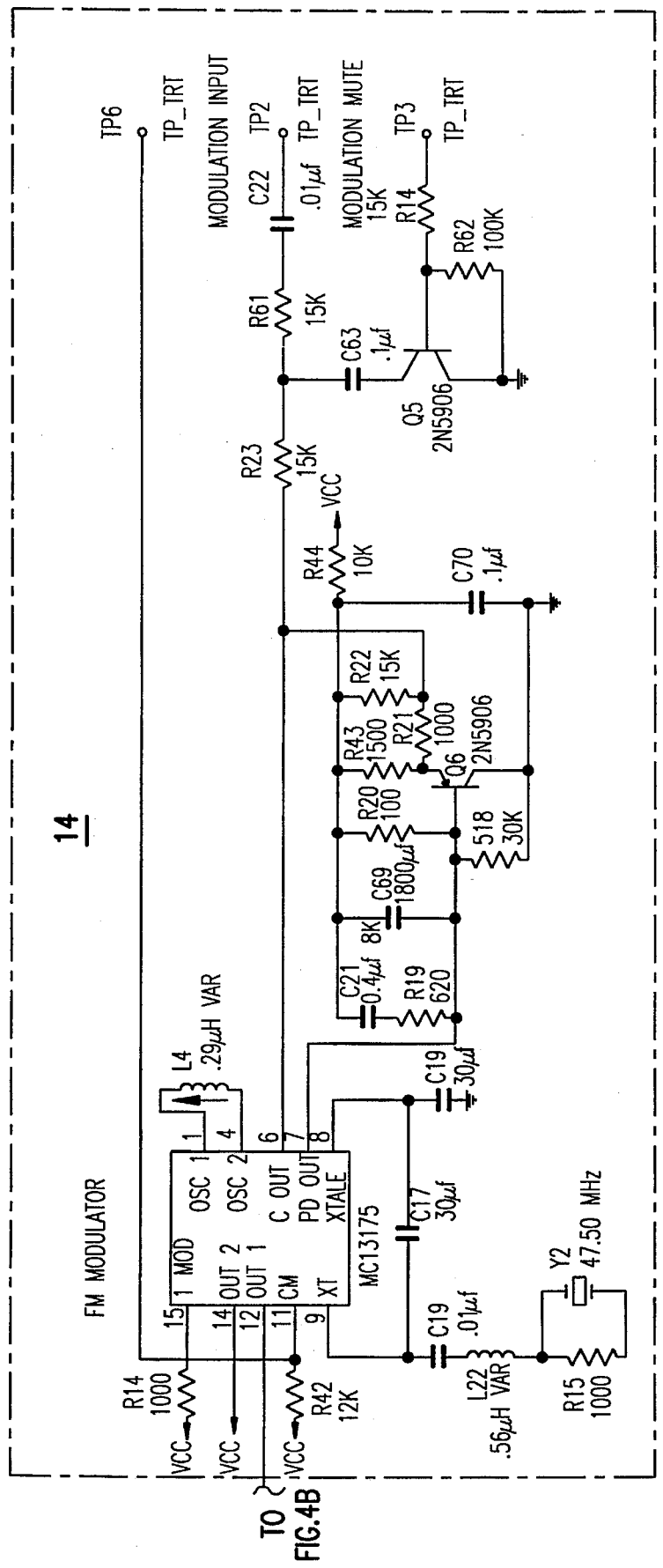
Figure 4F:
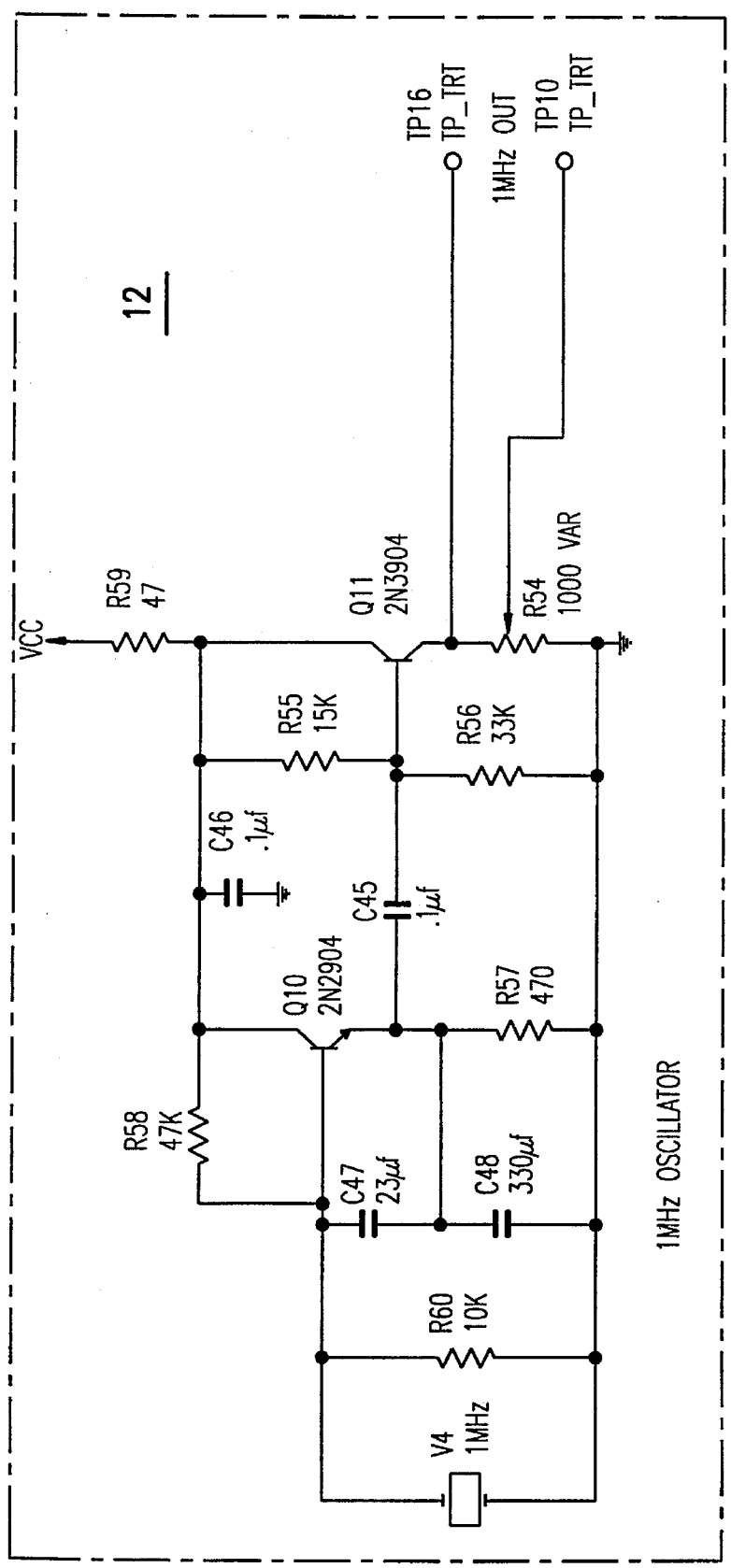
Figure 4G:
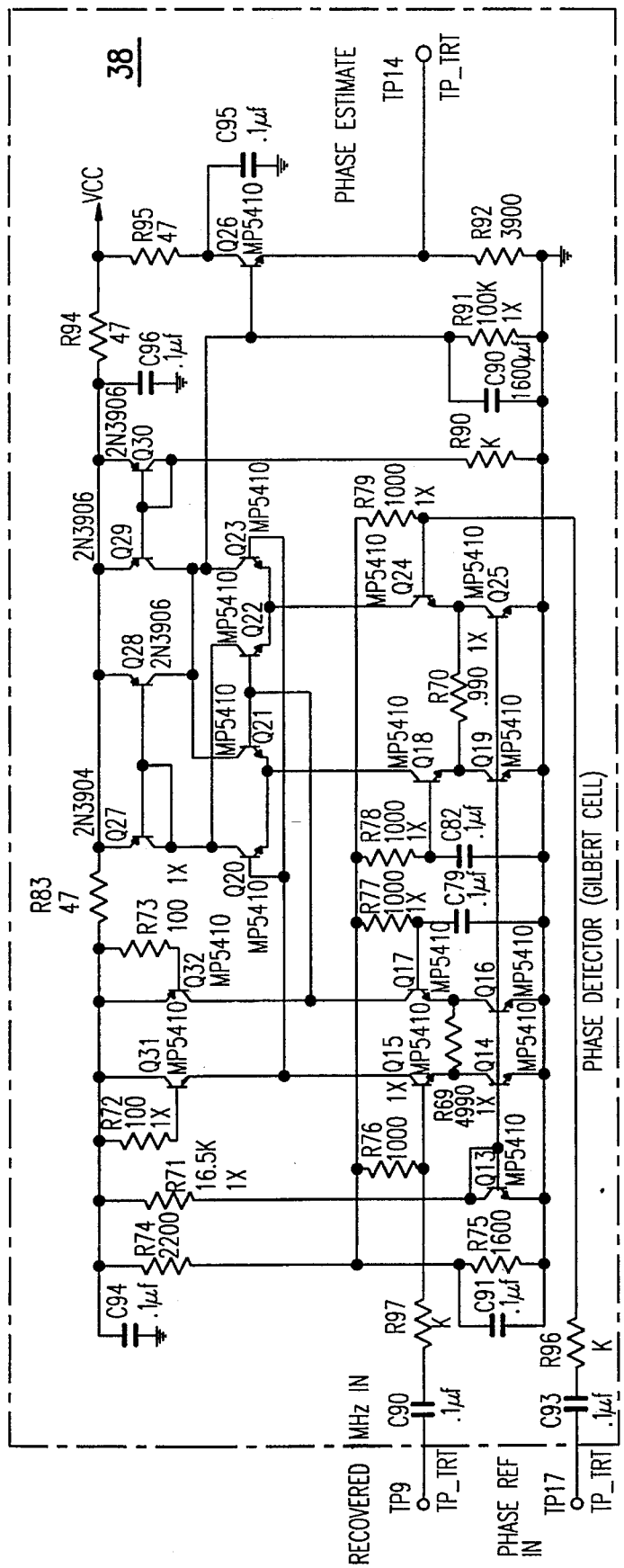
Figure 4H:
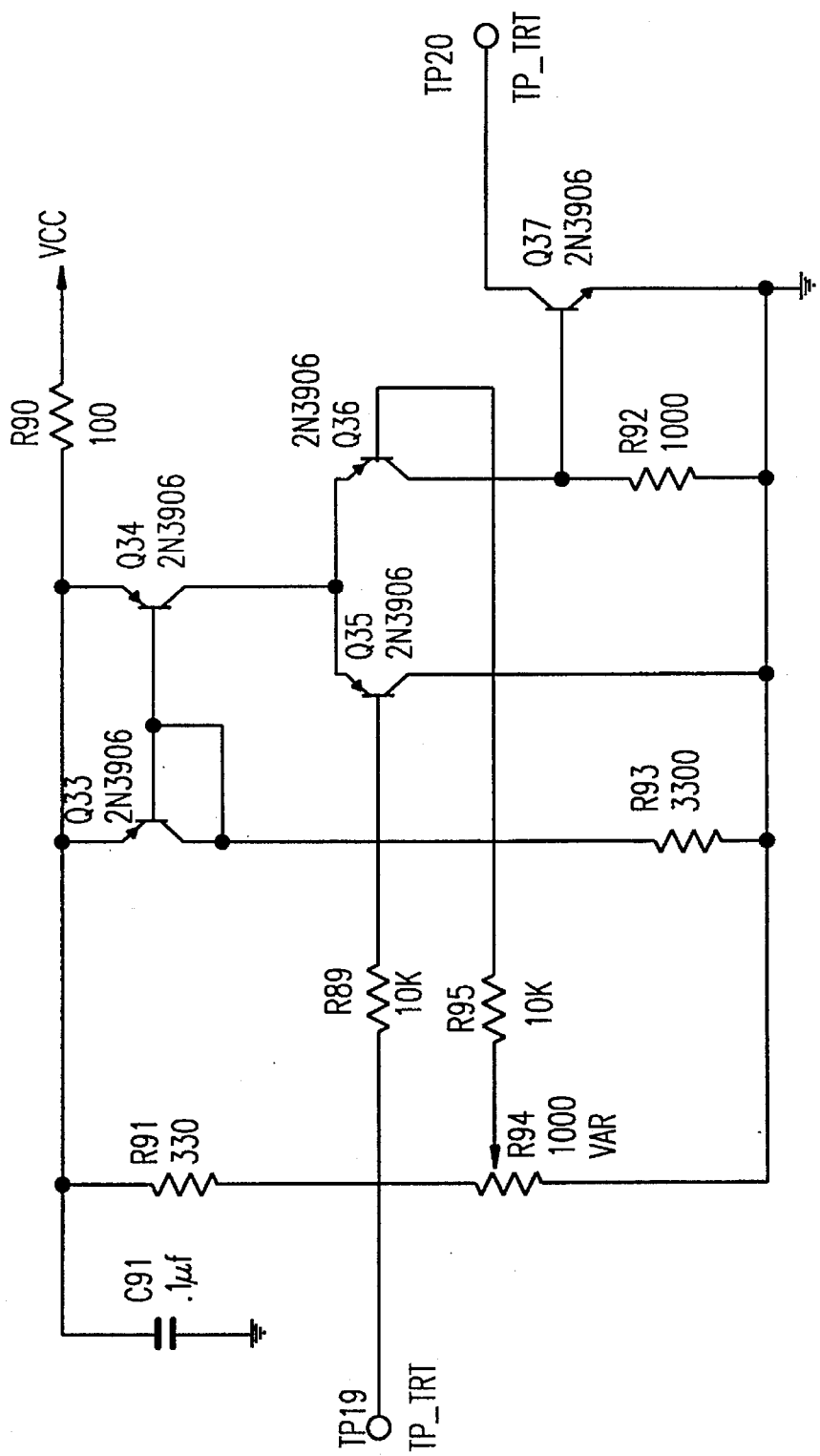
Figure 4I:
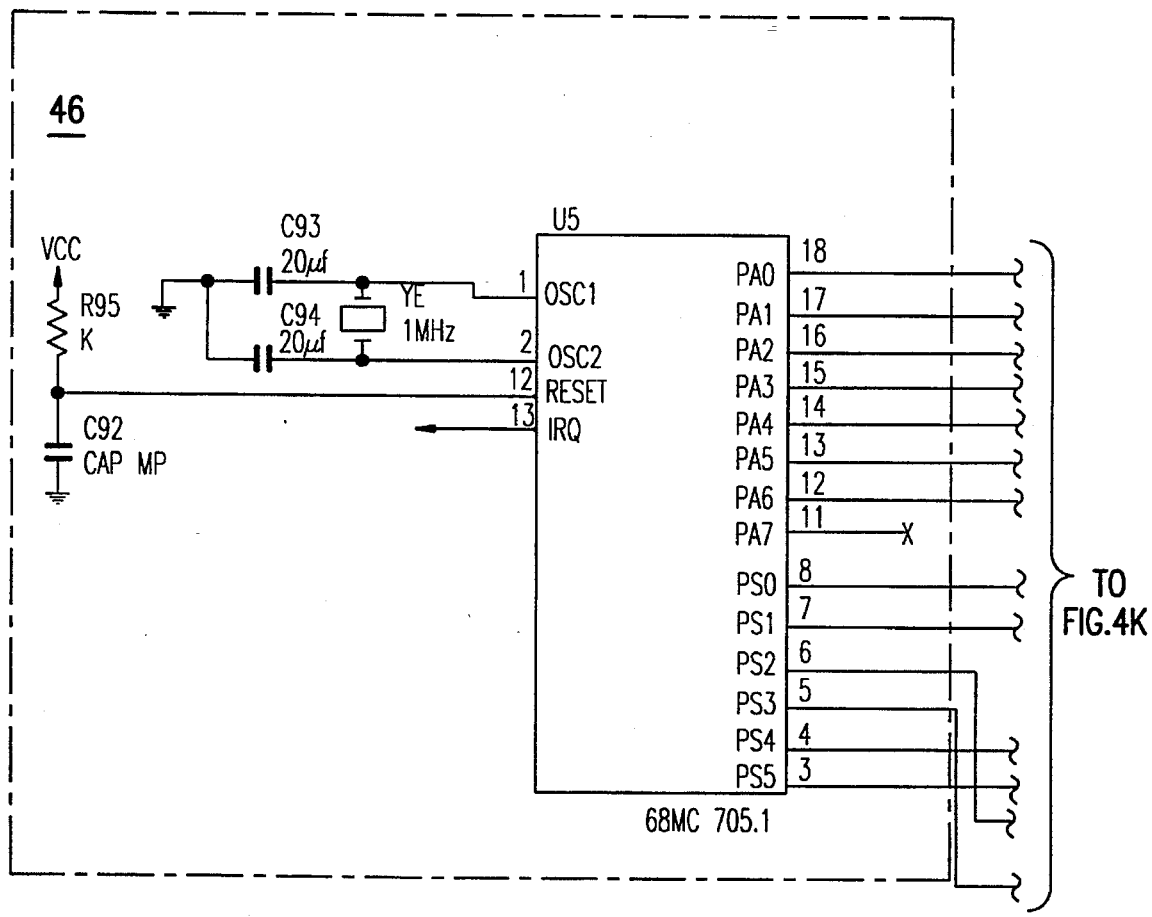
Figure 4J:
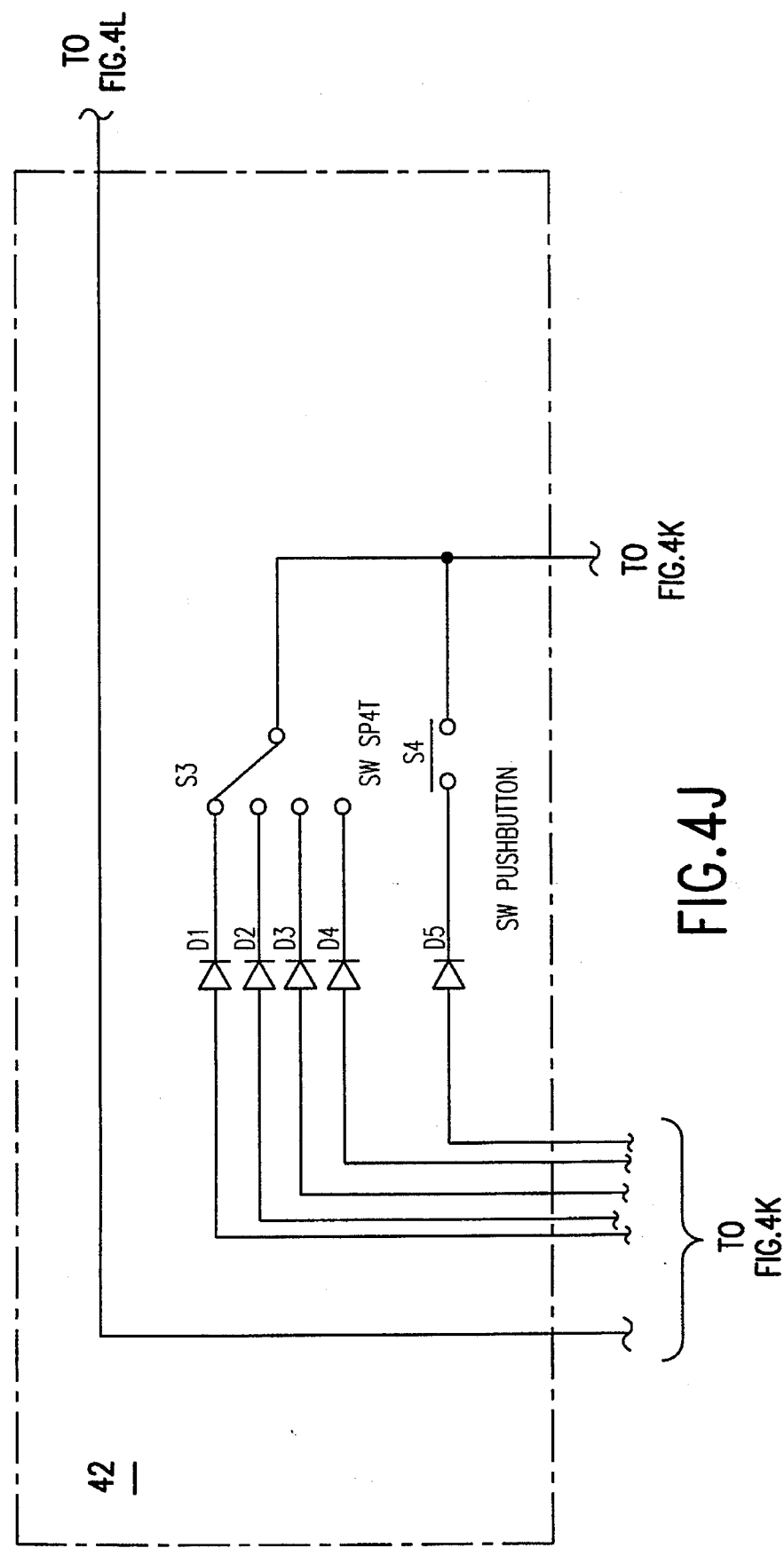
Figure 4L:
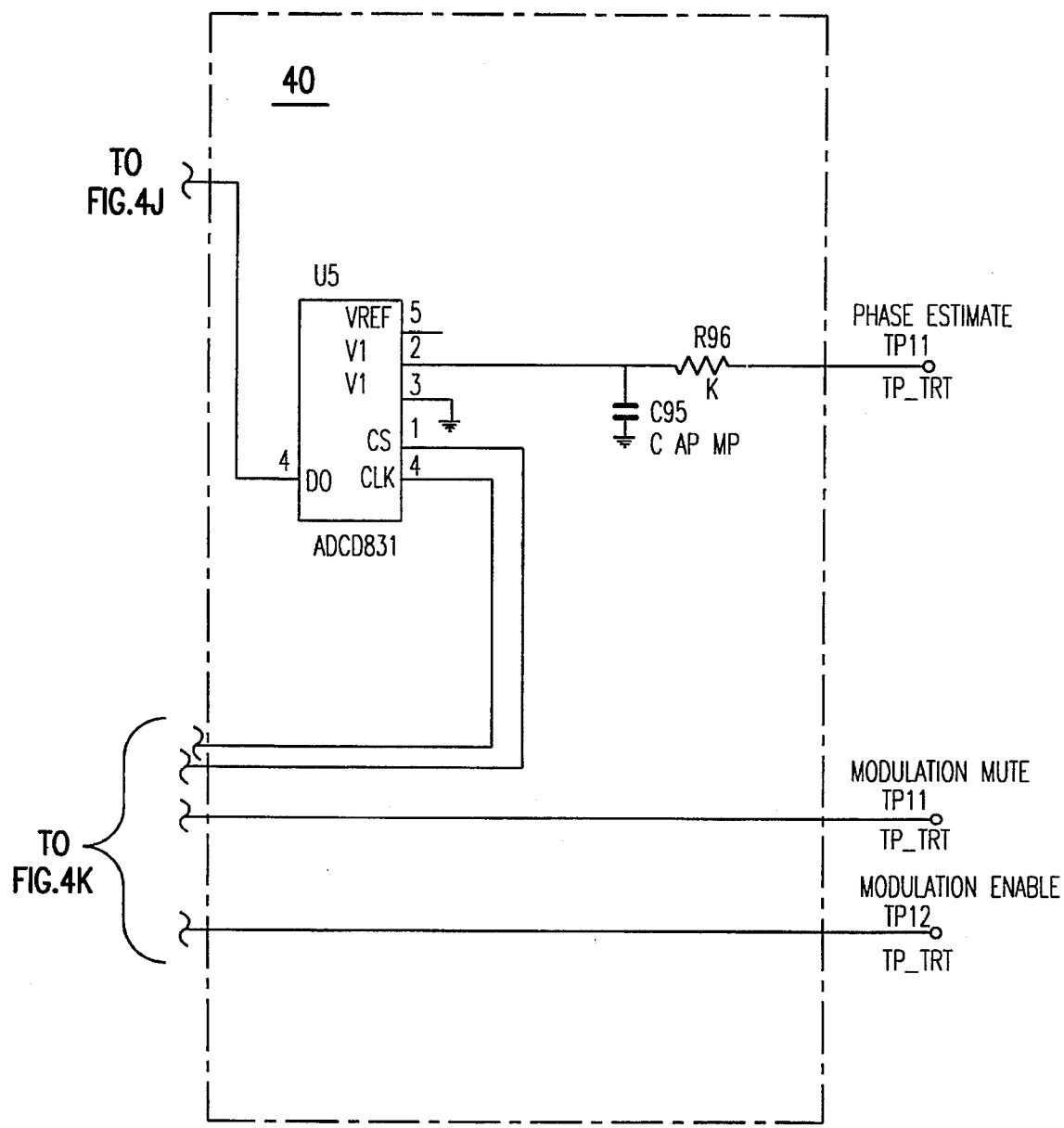
Figure 4M:
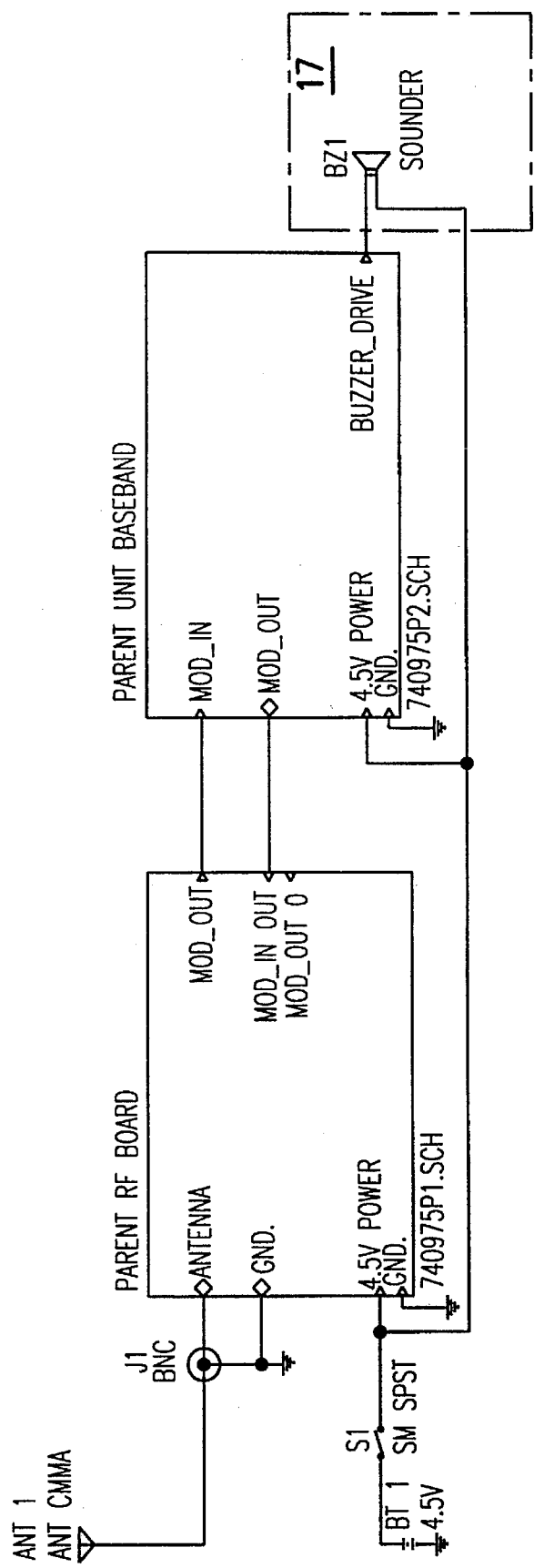
Figure 5A:
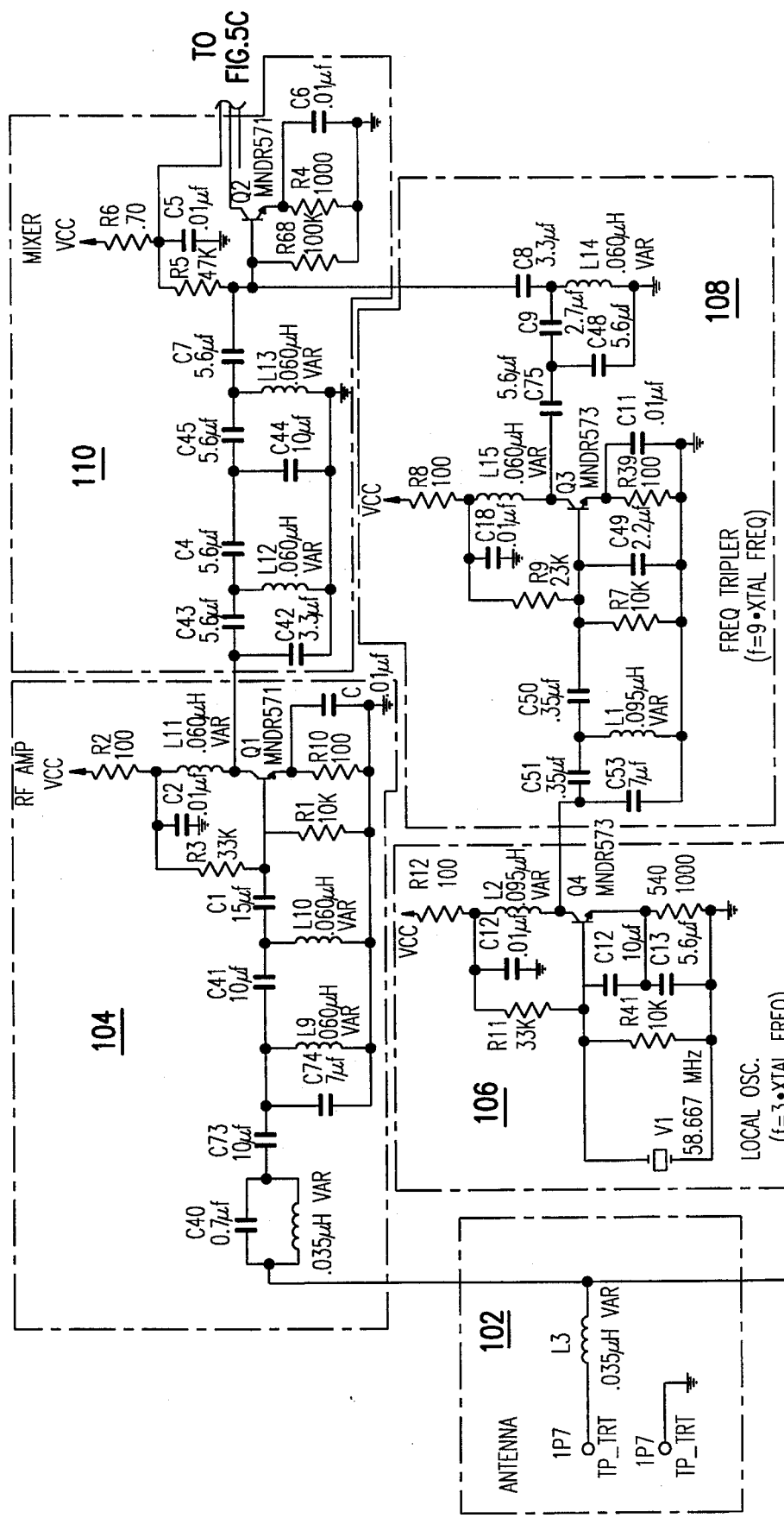
FIGS. 5A and 5G are schematic diagrams of a preferred embodiment of the secondary unit of FIG. 3.
Figure 5B:
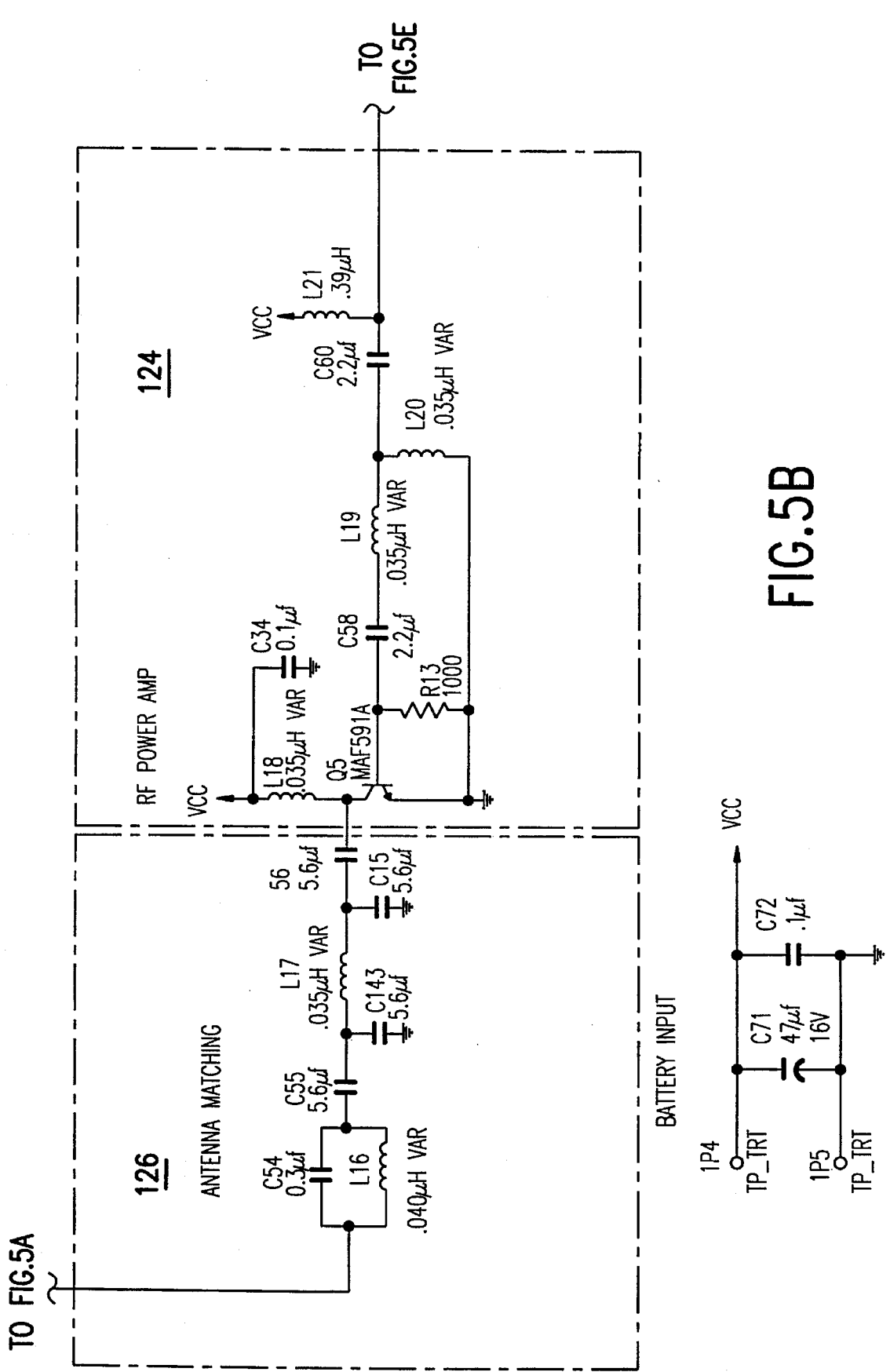
Figure 5E:
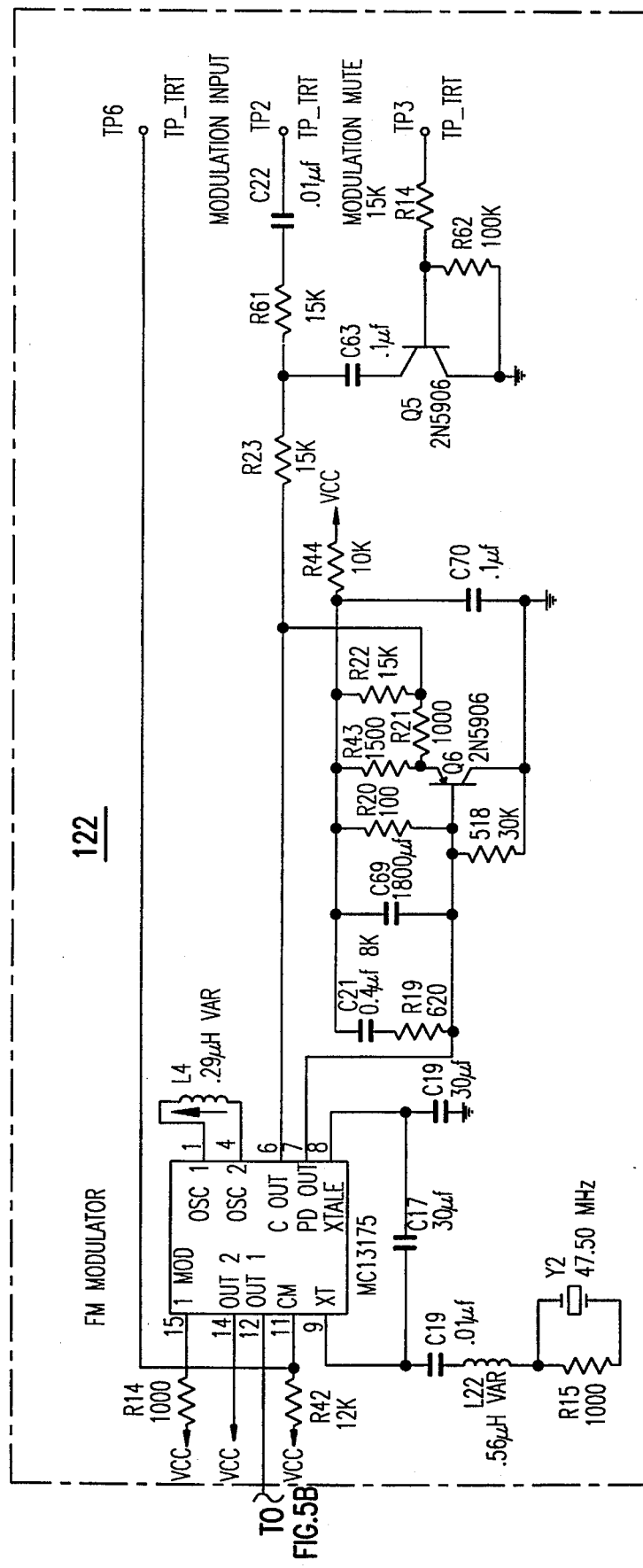
Figure 5F:
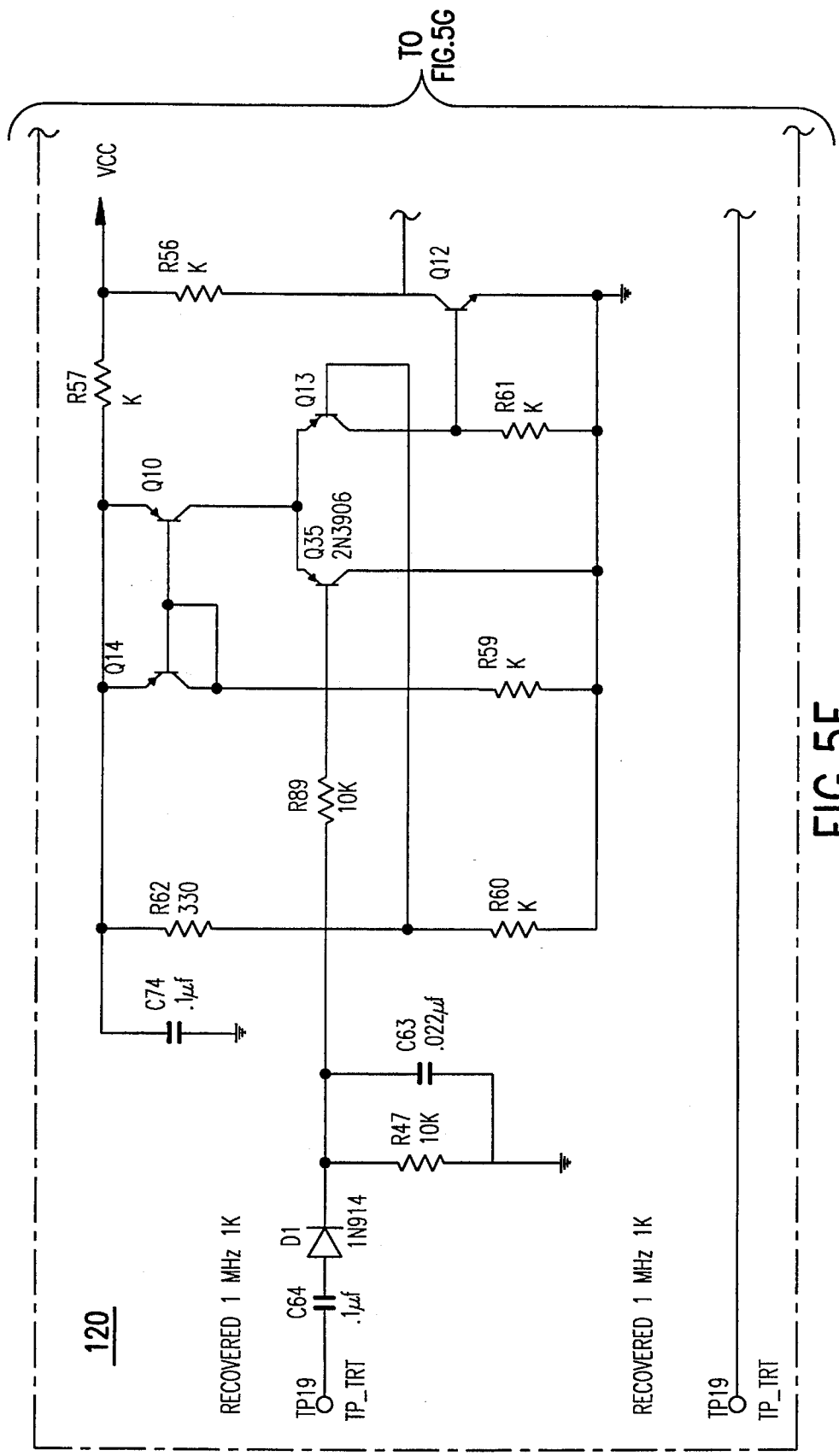
Figure 5G:
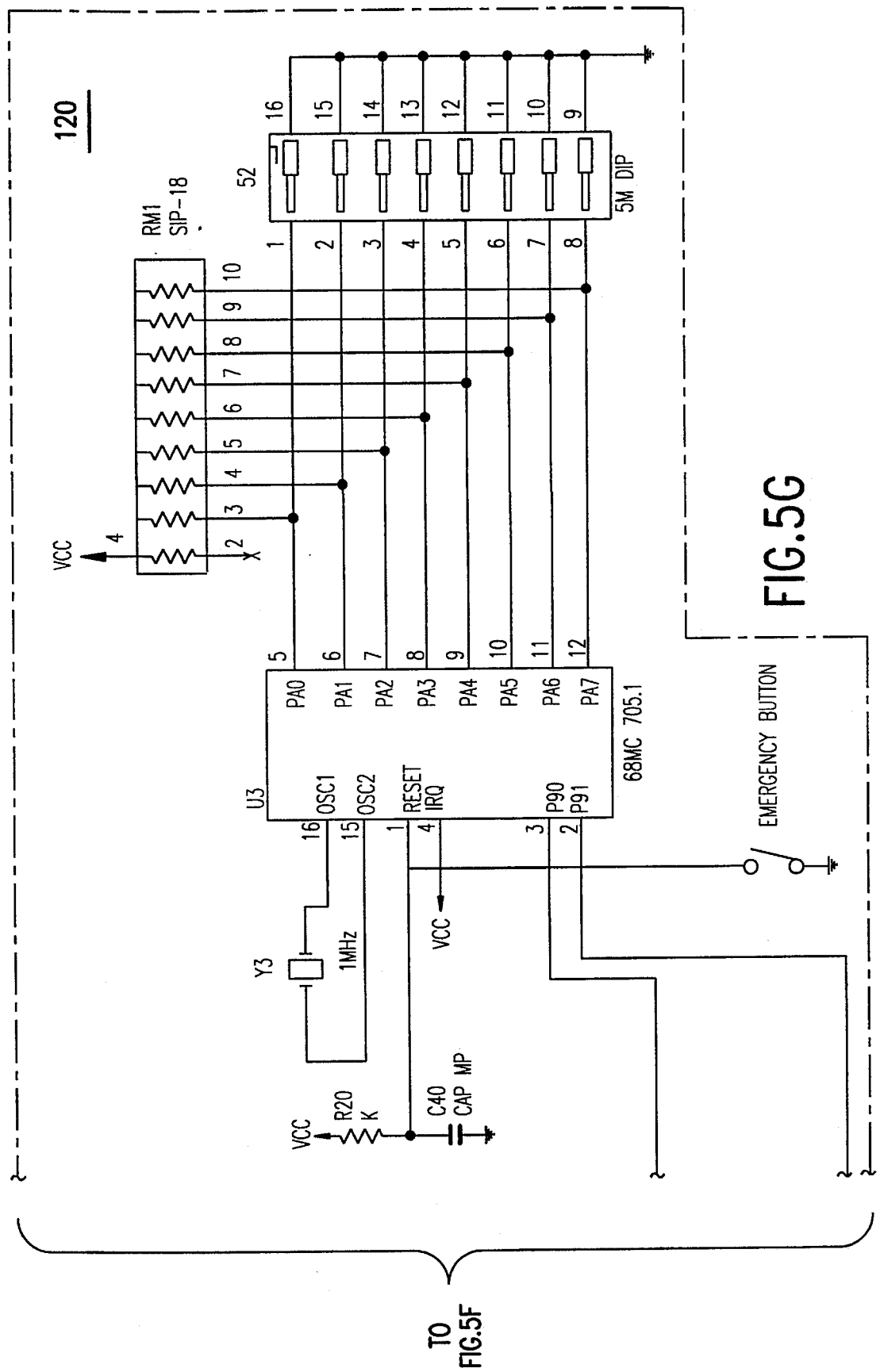

Block diagrams of a preferred embodiment of the base and secondary units of FIG. 1 are shown in FIGS. 2 and 3, respectively. FIGS. 4 and 5 are schematic diagrams of the current preferred embodiment of FIGS. 2 and 3, respectively. Base unit 10a, FIG. 2, includes transmitter 11a, which includes 1 MHz oscillator 12. The signal from this oscillator is provided to FM modulator 14, which generates a 380 MHz carrier signal and modulates the 1 MHz reference signal onto the carrier signal. The output from the modulator is amplified by amplifier 16 and provided to antenna 20 through antenna matching circuit 18. Any other type of modulation scheme could alternatively be used.

The signal radiated by antenna 20 is received by antenna 102 of secondary unit 100a, FIG. 3. Receiver 101a includes RF amplifier 104 which amplifies the signal, improves the signal-to-noise ratio, and passes the signal to mixer 110. Local oscillator 106 and frequency tripler 108 together generate a 423 MHz signal which is also provided to mixer 110. The mixer output signal of 43 MHz is filtered by IF filter 112, amplified by first limiter 114, and further amplified and demodulated by second limiter/demodulator 116. The output from limiter/demodulator 116 is the 1 MHz reference signal that was originally added to the RF signal by the base unit.

This 1 MHz reference signal is provided to transmitter 103a, which includes buffer 118 for filtering the signal, and decoder 120 (which is a small microprocessor) for ensuring that the signal received by the secondary unit was generated by the base unit which matches the secondary unit. This encoding is put in place in order to eliminate interference from other similar out-of-range alarm systems operating in the vicinity of the pair of units comprising this system. The encoding may be accomplished by rapidly turning on and off the 1 MHz reference signal in the first portion of each transmission from the base unit, which is preferably pulsed to turn on for 1/10th of a second each second as a means of reducing power drain. Decoder circuit 120 looks for this transmitted code, and if the transmitted code matches the internally set code, allows the secondary unit to turn on its transmitter for the remainder of the base signal transmit duration. This "okay to transmit" signal is provided to FM modulator 122 which modulates the 1 MHz reference signal onto a 219 MHz carrier signal. The modulated signal is amplified by amplifier 124 and provided to antenna 102 through antenna matching circuit 126. This signal is then transmitted by antenna 102.

Emergency button 119 can be pushed by the wearer to generate an alarm signal for transmission to the base unit. In this manner, the wearer can contact the base unit monitor if necessary.

The signal transmitted by antenna 102 is received by receiver 13a of base unit 10a, FIG. 2. Receiver 13a recovers the 1 MHz reference signal in a manner similar to the manner in which the secondary unit recovered the 1 MHz signal. This is accomplished with RF amplifier 22, and mixer 24, which also receives a 528 MHz signal from local oscillator 26 and frequency tripler 28. The resulting 43 MHz signal is filtered by IF filter 30, amplified by first limiter 32, and further amplified and demodulated by second limiter/demodulator 34. The output signal from second limiter/demodulator 34 is the 1 MHz reference signal that was received by antenna 20.

The signal, after filtering by buffer 36, is passed to phase detector 38, which is part of distance resolver means 15a. Phase detector 38 also receives the original 1 MHz signal from oscillator 12, and compares the phase of the signal from buffer 36 to the phase of the signal from oscillator 12. Because of the time delay caused by the signal travelling from the base unit to the secondary unit, and back, the recovered signal provided by buffer 36 will be out of phase with the reference signal provided by oscillator 12 by an amount that is proportional to the distance travelled. The output of the phase detector is a DC voltage which is digitized by analog-to-digital converter 40, and then processed into distance information by microprocessor/controller 46.

For systems with an alarm, the distance information provided at the output of microprocessor/controller 46 is provided to range alarm 17, which outputs an alarm signal if the measured range exceeds the range selected by the user through distance range selection switch 44. The alarm may also be sounded if the secondary unit "emergency" button had been pressed. Microprocessor/controller 46 also serves as the timing controller and code generator for base unit 10a. It also controls modulation by modulator 14, and also can mute the modulation if desired.

This scheme thus is able to determine the distance between the two units without relying on signal strength attenuation as a means of determining the distance. Since the phase lag is caused only by the internal circuitry of the two units, and the distance between the two units, it is an accurate means of determining the distance between the units. The amount of phase lag introduced by the circuitry in each unit can be effectively cancelled by calibrating the units when they are a known distance apart, using range calibration switch 42. As an example of range calibration, the operator could be instructed to separate the base and secondary units by a certain amount, for example 20 feet. Range calibration switch 42 would then be pressed to enable a transmission, retransmission, and receipt cycle. Since the distance is known, all phase lag which is in addition to that caused by the distance must be caused by internal circuitry propagation delays. This amount of lag may then be stored and subtracted from the signal received, during use of the system, by microprocessor/controller 46 from A/D converter 40; so that the range information provided by the microprocessor/controller 46 is accurate.

Power for both units is supplied using small, portable batteries, not shown. An on/off switch, not shown, is also provided for each unit to conserve battery power when the units are not in use.

FIGS. 4A through 4M are schematic diagrams of a preferred embodiment of parent unit 10a, FIG. 2. Circuitry corresponding to the blocks of FIG. 2 have been labelled with like numbers in FIGS. 4A through 4M. Similarly, FIGS. 5A through 5G are schematic diagrams of a preferred embodiment of child unit 100a, FIG. 3, which has been labelled in a similar fashion.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A system, of the type having a plurality of transceiver units for generating an alarm when a child transceiver unit is more than a predetermined distance away from a parent transceiver unit, the system comprising:

(a) a portable parent unit;

(b) a first transmitter portion, disposed in the parent unit, the first transmitter portion having:
      (i) a first rf transmitter, operative at a first carrier frequency, having an output;
      (ii) a signal generator for generating a first reference signal;
      (iii) a first FM modulator, coupled to the first rf transmitter, for modulating the first carrier with the first reference signal;
      (iv) a first digital encoder for digitally encoding the FM-modulated carrier with a digital signature to identify the output of the first transmitter;

(c) a portable child unit of a size permitting it to be worn by a human subject, the child unit having:
      (i) a second receiver, tuned to the first carrier frequency, for receiving a signal broadcast from the output of the first transmitter;
      (ii) a digital decoder for decoding the digital signature from the signal received by the second receiver and providing a decoded output;
      (iii) an inhibitor arrangement, coupled to the digital decoder, for preventing transmission by the child unit unless the decoded output meets criteria stored in the child unit;
      (iv) a second rf transmitter, operative at a second carrier frequency, and having an output; and
      (v) a second FM modulator, coupled to the second rf transmitter and to the second receiver, for modulating the second carrier with a second reference signal having a prespecified phase relationship to the first reference signal as received by the second receiver;

(d) a first receiver portion, disposed in the parent unit, the first receiver portion having:
      (i) a first receiver, tuned to the second carrier frequency, for providing an output of the demodulated second reference signal;
      (ii) a distance resolver, coupled to the first receiver and the signal generator, for providing an output signal dependent on the phase relationship, between the first reference signal and the demodulated second reference signal, that is indicative of the distance between the child unit and the parent unit; and
      (iii) an alarm, coupled to the distance resolver, triggered if the output signal from the distance resolver, exceeds a specified maximum distance.

2. A system according to claim 1, wherein the child unit further has an emergency button for causing the generation of an alarm signal for transmission to the parent unit.

3. A system according to claim 2, wherein the parent unit further has a range selection switch accessible to the user for specifying the maximum distance.

4. A system according to claim 1, wherein the parent unit further has a range selection switch accessible to the user for specifying the maximum distance.

* * * * *